Oct. 11, 1949.  G. E. UNDY  2,484,767
ELECTRICAL CONTROL SYSTEM
Filed July 26, 1943  2 Sheets-Sheet 2
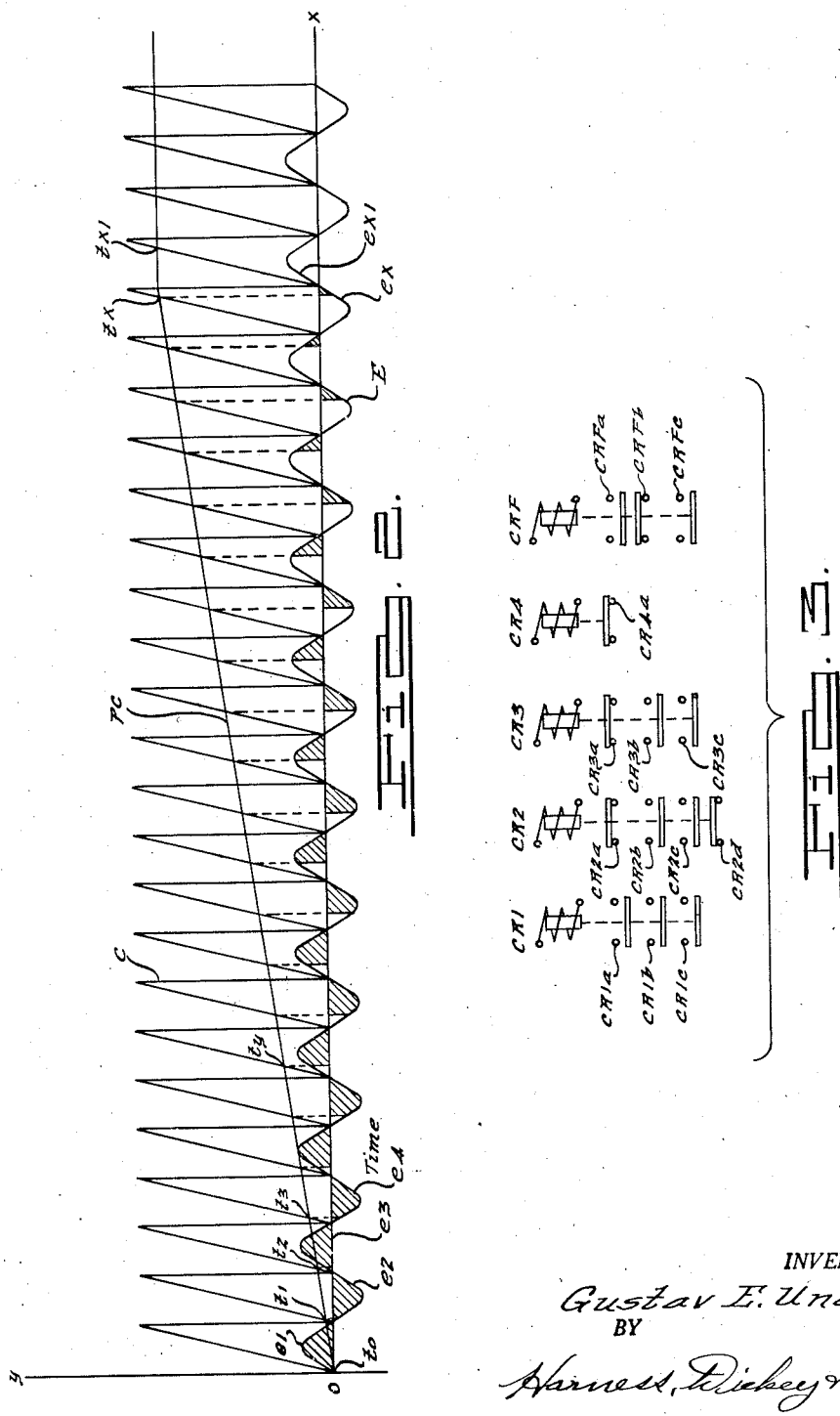
INVENTOR.
Gustav E. Undy.
BY
Harness, Dickey & Pierce Patented Oct. 11, 1949

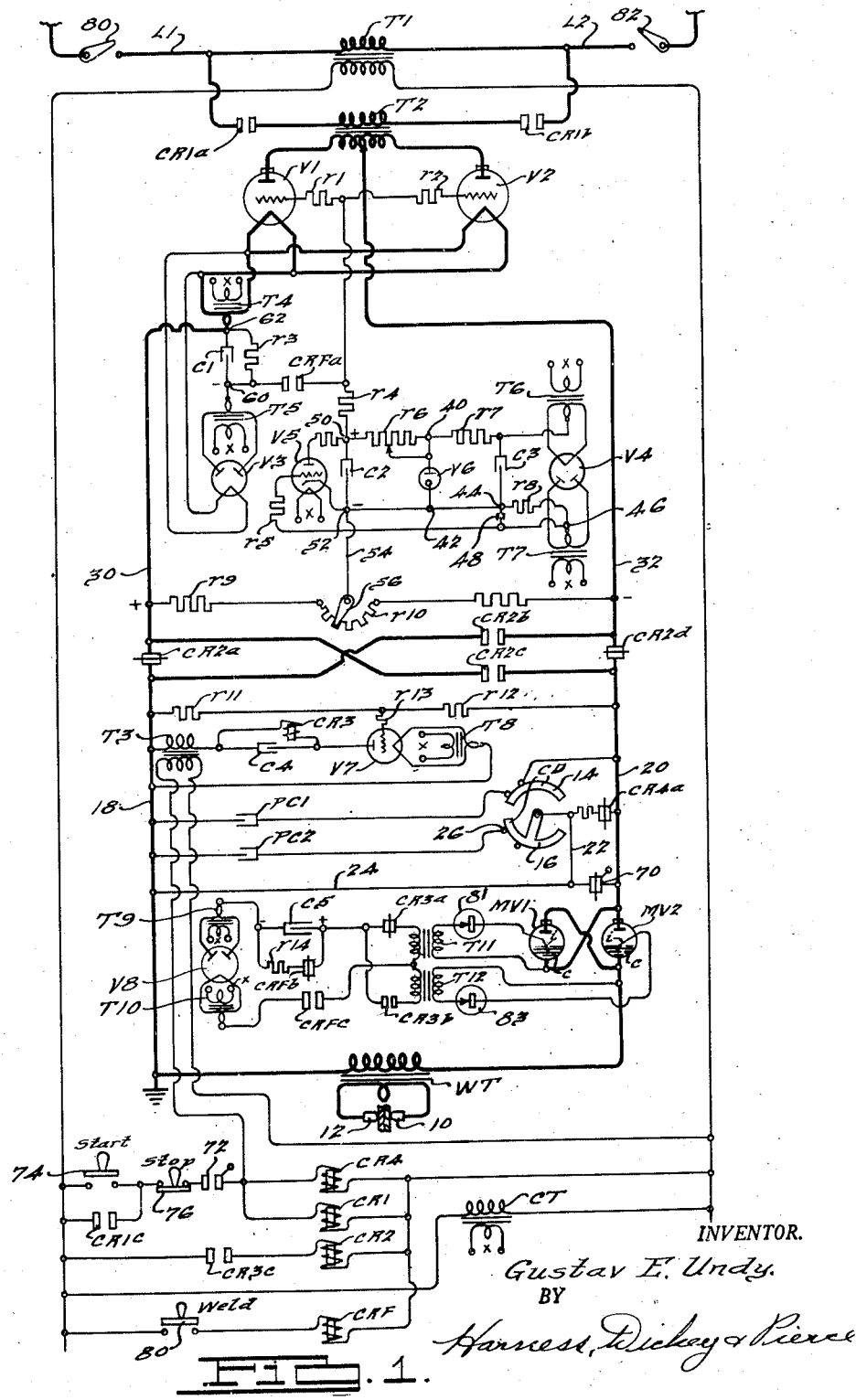

2,484,767

UNITED STATES PATENT OFFICE 2,484,767

ELECTRICAL CONTROL SYSTEM

Gustav E. Undy, Detroit, Mich., assignor, by mesne assignments, to Weltronic Company, Oakland County, Mich., a corporation of Michigan Application July 26, 1943, Serial No. 496,147

16 Claims. (Cl. 320—1)

The present invention relates to electrical control systems, and in particular provides an improved resistance welding system of the condenser discharge type.

The principal objects of the invention are to provide a system of the above type, which is simple in arrangement, economical of manufacture, and which is reliable and efficient in operation; to provide such a system including improved means for controlling the charging rate of the main or power condensers which supply the energy to the welding circuit; to provide such a system in which the just-mentioned means act to progressively decrease the charging rate as the power condensers approach the fully charged condition; to provide such a system including phase shift means, controlled in accordance with the degree to which the power condensers are charged, for controlling rectifying means through which the power condensers are charged; to provide such a system wherein the power condensers are coupled to the load circuit in such relation that reactive energy stored in the load circuit is returned to and serves to recharge the power condensers to a reverse polarity, and wherein means responsive to the polarity of the power condensers is utilized to control the connection between the power condensers and the load circuit and to further control the connection between the power condensers and the source of charging current; and to generally improve and simplify the arrangement and operation of systems of the above type.

With the above as well as other objects in view, which appear in the following description and in the appended claims, a preferred but illustrative embodiment of the invention is shown in the accompanying drawings, in which:

Figure 1 is a diagrammatic illustration of a control system embodying the invention;

Fig. 2 is a diagrammatic view illustrating the control of the charging action; and Fig. 3 is a diagrammatic view showing the mechanical relation between certain switch coils and contacts which are shown separately from each other in Fig. 1.

It will be appreciated from a complete understanding of the invention that, in a generic sense, improvements thereof may be embodied in control systems designed for a wide variety of different uses and may also be embodied in various different specific constructions. In an illustrative but not in a limiting sense, the present invention is herein disclosed in connection with a resistance welding system, which system embodies certain features disclosed and claimed in applicant's copending application, Serial No. 447,305, filed June 16, 1942.

Referring first to Fig. 1, the electrodes 10 and 12 of an illustrative welding machine are illustrated as being conventionally connected in a closed circuit with the secondary winding of a usual welding transformer WT. The primary winding of tranformer WT is connected, in series relation with a pair of reversely connected main electric discharge devices MV1 and MV2, to receive power from an energy storage system herein illustrated as comprising a pair of power condensers PC1 and PC2. A control drum CD is provided to selectively render the condenser PC2 effective or ineffective. This control drum is provided with two segments 14 and 16, which may be simultaneously rotated. In the illustrated position, segment 14 connects condenser PC1 between the welding current leads 18 and 20, whereas segment 16 short circuits condenser PC2 upon itself through conductors 22 and 24, and a portion of conductor 18. It will be appreciated that if the drum CD is rotated counterclockwise sufficiently far to bring segment 14 into engagement with the terminal 26, associated with condenser PC2, the just-mentioned short circuit is interrupted, and condenser PC2 is connected between the leads 18 and 20, in parallel with condenser PC1.

The above-mentioned main discharge devices may be of any suitable type, but are illustrated herein as being of the immersed igniter-mercury pool type sold commercially under the trade name "Ignitron." As is well known, these valves are normally non-conductive, but become conductive if an igniting potential is applied thereto while the anodes thereof are positive.

In the broader aspects of the invention, any of a variety of firing circuits for the main rectifiers MV1 and MV2 may be utilized. The illustrated firing circuits embody the invention disclosed and claimed in the copending application of Cletus J. Collom, Serial No. 525,734, filed March 9, 1944, now Patent No. 2,430,390 dated November 4, 1947. As shown, these firing circuits comprise transformers T11 and T12, the secondary windings whereof are connected, respectively, between the igniters $i$ and the cathodes $c$ of main rectifiers MV1 and MV2. The primary windings of transformers T11 and T12 are arranged to receive energy from a direct current source comprising transformer T9 and rectifier V8. As shown, these primary winding circuits include back and front contacts CR3$a$ and CR3$b$ of the hereinafter described control relay, although, if desired, such contacts may be omitted. This is for the reason that even though both rectifiers MV1 and MV2 be simultaneously subjected to a firing impulse, only one thereof is rendered conductive, since only one thereof has the proper anode polarity. Relay CR3 is controlled in accordance with the polarity of the main condensers, and serves to determine which of the main rectifiers is supplied with a firing impulse in order to initiate a particular welding cycle. The just-mentioned primary winding circuits also include a normally open contact CRFc of the hereinafter described firing relay CRF. This contact is closed in order to initiate a welding operation and enables the source comprising rectifier V8 to pass a surge current through one or the other of the transformers T11 and T12, depending upon the position of relay CR3. As described below, the secondary voltage developed by transformer T11 or T12, as the case may be, is of very short duration, being a very minor fraction of a half cycle of an alternating current source of commercial frequency, and an even smaller fraction of the discharge period of the main condensers.

As described below, an operation of relay CR3 takes place at an intermediate stage of each welding operation, which transfer interrupts the circuit for one of the transformers T11 and T12 and completes the circuit for the other. In order to prevent this transfer from subjecting the rectifiers MV1 and MV2 to a false firing impulse, and, as aforesaid, to render each firing impulse of very short duration, means are provided which prevent, until reset, more than a single short surge of current from the source comprising rectifier V8 to the firing circuits. As shown, this means includes condenser C5, which, as will be understood, permits the initial surge, but becomes fully charged considerably ahead of the above-described transfer action of relay CR3 and so blocks further flow from the direct current source. In order to discharge condenser C5, the firing relay is provided with a back contact CRFb, which closes at the conclusion of each welding operation and enables condenser C5 to discharge through a resistor r14. Relay CRF is so constructed that the opening of contact CRFc precedes the reclosure of contact CRFb.

It will be noticed that each surge of current through transformer T11 or T12, as the case may be, produces two secondary voltage peaks of respectively opposite polarity in the corresponding transformer. The first of these surges is produced by the abrupt rise in current which follows the initial closure of contact CRFc and the other peak, of opposite polarity, is produced by the collapsing of the field of the transformer which results from the stoppage of current flow, due to the charging of the condenser C5. Preferably and as shown, that one of these voltage peaks which would render the cathode of the corresponding main rectifier MV1 or MV2 positive with respect to its igniter, is suppressed, so that such main rectifier is subjected only to a single impressed voltage, which impressed voltage is of a proper polarity to render it conductive. The illustrated suppressing means comprises usual rectifiers 81 and 83, which may be of the so-called dry disk or contact type.

As mentioned above, in the present system the power condensers PC1 and PC2 are charged to alternately opposite polarities. This enables the reactive energy stored in the welding circuit during the making of the weld to be returned to and partially recharge the power condensers. With this relation, accordingly, successive welds are initiated by alternately firing the main devices MV1 and MV2, device MV2 being fired under conditions when the main welding conductor 20 is positive and device MV1 being fired under conditions when the main welding lead 18 is positive.

The previously mentioned control switch CR3 and an associated network comprising valve V7 are utilized to respond to the polarity of the power condensers and to, consequently, determine which of the main discharge devices MV1 and MV2 is to be fired. As shown, switch CR3 is connected in series with the secondary winding of a normally energized transformer T3, through the anode circuit of valve V7. The grid of valve V7, which may be of a usual gas-filled, discontinuous control type, is connected to line 18 through resistors r11 and r13 and is connected to line 20 through resistors r13 and r12. The cathode of valve V7, in turn, is connected directly to line 18. With this relation, it will be appreciated that so long as the polarity of the power condensers is such that line 18 is positive, the grid of valve V7 is negative with respect to the cathode. This action renders valve V7 non-conductive and maintains switch CR3 in a de-energized condition. Under these conditions, accordingly, contact CR3a of switch CR3 is closed, preparing a circuit by which the source comprising rectifier V8 may be connected to energize transformer T11, associated with the main discharge device MV1. Under the same conditions, contact CR3b of switch CR3 is open, thereby preventing the energization of transformer T12, associated with the other main discharge device MV2. On the other hand, so long as the polarity of the power condensers is such that line 20 is positive, the grid of valve V7 is positive relative to the cathode, which action enables transformer T3 to maintain switch CR3 in the energized condition. Under these conditions, the positions of contacts CR3a and CR3b are reversed, isolating transformer T11 from the source of firing current and preparing a circuit through which it may be connected to transformer T12.

In view of the fact that the power condensers are charged to alternately opposite polarities, the present system utilizes reversing means which are interposed between the source of charging current (transformer T2) and the power condensers. The reversing means is shown as comprising a usual electromagnetic switch CR2, having two back contacts CR2a and CR2d and two front contacts CR2b and CR2c. Switch CR2 is controlled by front contact CR3c of the previously-mentioned polarity-responsive switch CR3. As before, under conditions in which the polarity of the power condensers is such that line 18 is positive, switch CR3 remains de-energized. This action maintains switch CR2 in a de-energized condition. Under these conditions, the switch contacts CR2a, etc., occupy the illustrated positions, connecting the positive charging line 30 to the previously-mentioned line 18, and connecting the negative charging line 32 to the previously-mentioned line 20.

In the present system, the power condensers PC1 and PC2 derive charging current from a single phase source L1—L2, through a charging transformer T2 and a full wave rectifier, comprising valve V1 and V2. Valves V1 and V2 may be and preferably are of a usual three-element, gas-filled, discontinuous control type. As will be understod, these valves may be rendered non-conductive by maintaining the grids negative with respect to the cathodes. If, however, the grids are rendered neutral or positive with respect to their associated cathodes in half cycles in which the anodes are sufficiently positive with respect to the cathodes, they become conductive and remain so for the balance of the corresponding half cycle of current flow.

A feature of the present system resides in progressively decreasing the charging rate of the main condensers as the fully charged condition thereof is approached, so as to eliminate any possibility of charging the power condensers to a voltage in excess of a value appropriate to the welding operation. As shown, this progressive variation is accomplished by phase shifting means, which responds to the voltage of the power condensers, and serves to correspondingly delay the points, in successive half cycles of the source, at which valves V1 and V2 are rendered conductive.

More particularly, the above phase shifting apparatus includes an oscillator circuit comprising a control condenser C2 which is charged to the indicated polarity, and is discharged through the associated valve V5, once during each half cycle of the source. A suitable source of charging current for condenser C2 is illustrated as comprising a network including a usual voltage regulating glow discharge valve V6, and a full wave rectifier, comprising valve V4 and transformer T7. It will be recognized that during each half cycle, transformer T7, through valve V4, impresses a voltage across valve V6 which is equal to the output voltage of transformer T7, less the voltage drops across the associated resistors $r7$ and $r8$. For purposes of description, the network may be regarded as being in a de-energized condition at the time the system is initially placed in service and transformer T7 may be regarded as being initially energized at the zero point of its voltage wave. Under such conditions, the voltage impressed across valve V6 through rectifier V4 rises sinusoidally until a value is reached at which valve V6 breaks down. For example, assuming transformer T7 has a maximum voltage of approximately 600 volts, valve V6 may have a break-down voltage of 180 volts. As soon as valve V6 breaks down, the voltage drop across it falls to a value just sufficient to main a discharge therethrough, for example, 150 volts. During the first half of the half cycle in question, condenser C3 charges to a potential of, for example, 500 volts. At or about the beginning of the last half of the half cycle in question, the energy stored in condenser C3 starts to discharge through valve V6 and resistor $r7$. The timing of this discharge circuit is such that the potential of condenser C3 remains equal to, or in excess of, the value needed to maintain a discharge through valve V6 until such a point, in the next half cycle, that the voltage of transformer T7 attains a value sufficient to maintain a discharge through valve V6. When such point is reached, transformer T7 is again effective to supply charging current to condenser C3. After its initial break down in the initial half cycle, accordingly, valve V6 is continuously supplied with potential of a valve sufficient to maintain a discharge through it, and valve V6 is, consequently, continuously effective to maintain, between terminals 40 and 42, a substantially fixed potential equal to the just-mentioned discharge-maintaining value.

Condenser C2 is coupled across terminals 40 and 42, through a potentiometer $r6$, which may be adjusted to determine the charging rate of condenser C2 and to, consequently, determine the maximum voltage to which condenser C2 is charged in the course of each half cycle. In the present system, the charging rate is preferably adjusted so that condenser C2 requires substantially a full half cycle in which to reach the full potential between terminals 40 and 42.

The discharge of condenser C2 takes place, substantially instantaneously, through the previously mentioned valve V5, which may be and preferably is of the usual three-element, gas-filled, discontinuous type. As illustrated, the grid of valve V5 is coupled, through a resistor $r5$, to terminal 46, the center tap of the rectifier transformer T7. The cathode of valve V5, in turn, is coupled to the terminal 46 through resistor $r8$. It will be appreciated that so long in each half cycle as the voltage of transformer T7 is high enough to enable it to transmit current through the circuit, including valve V6 and resistors $r7$ and $r8$, the potential drop across resistor $r8$ is such as to render the grid of valve V5 negative with respect to the cathode thereof. Towards the close of each such half cycle, however, the output of transformer T7 falls to a value too low to maintain the just-mentioned flow of current. At the instant that this current flow through resistor $r8$ ceases, the potential drop across resistor $r8$ disappears, which action renders the grid of valve V5 neutral with respect to the cathode thereof and enables condenser C2 to discharge through valve V5. It will be understood that this discharge takes place substantially instantaneously. In accordance with usual oscillator practice, also, the slight amount of reactive energy stored in this discharge circuit momentarily renders the cathode of valve V5 positive with respect to the anode, thereby stopping the discharge.

The ratio of the maximum potential of transformer T7 and the voltage needed to maintain a discharge through valve V6 is preferably such that current flow through the biasing resistor $r8$ is maintained until a point which is very near the end of each half cycle, in which event, for all practical purposes, condenser C2 may be regarded as being in a fully discharged condition at the beginning of each half cycle and may further be regarded as being discharged at the end of each half cycle. If it is desired to precisely synchronize the discharge of condenser C2 with the voltage of transformer T7 so as to insure that the charging action of condenser C2 begins precisely at the beginning of each half cycle, an auxiliary condenser 48 may be connected across resistor $r8$, the energy whereof serves to maintain the biasing current through resistor $r8$ for an appropriate time after the potential of transformer T7 has fallen to too low a value to maintain such biasing current.

It will be recognized that the grid of valve V5 is neutral with respect to its cathode from the time that the biasing potential across resistor $r8$ disappears, towards or at the end of the half cycle in question, until the time, in the next half cycle, at which the voltage of transformer T7 again attains a value sufficiently high to again pass current through the circuit including resistor $r8$. As aforesaid, the proportioning of the circuit elements is preferably such that this point is attained very near the beginning of such succeeding half cycle. At the beginning of such succeeding half cycle, the continuously applied potential between terminals 40 and 42 again becomes effective to pass charging current to condenser C2. Until after the point in such succeeding half cycle is reached, however, at which transformer T1 is again able to apply the biasing potential across resistor r8, so much of the potential between terminals 40 and 42 is dissipated in resistor r6 that the potential across valve V5 is below the critical anode-cathode voltage of this valve. Consequently, after having been fired at the conclusion of one half-cycle, valve V5 is supplied with insufficient anode-cathode potential to again fire it in the next half cycle until after the biasing potential is again applied thereto. The succeeding firing of valve V5 is, therefore, postponed until the end of such succeeding half cycle, at which time the discharging of condenser C2 proceeds as before.

It will be appreciated from the foregoing, accordingly, that at the beginning of each successive half cycle of the source, condenser C2 is in a discharged condition, that the charge thereon gradually rises during the course of each such half cycle and at the end thereof, condenser C2 rapidly discharges. This action is diagrammatically depicted in Fig. 2, in which the curve E represents the voltage of the source, and the curve C represents the potential of condenser C2.

Considering now the manner in which the potential across condenser C2 controls the conductivity of valves V1 and V2, it will be noticed that the grid of valve V1 is connected to the positive terminal 50 of condenser C2, through resistors r4 and r1, and that the grid of valve V2 is connected to terminal 50, through resistors r4 and r2. The cathodes of valves V1 and V2, on the other hand, are connected to the negative terminal 52 of condenser C2, through conductor 30, resistor r9, a portion of resistor r10 and conductor 54. It will be noticed that the circuit containing resistors r9 and r10 is connected directly between the positive and negative charging lines 30 and 32, which lines, during charging periods, are connected, through one or the other sets of contacts of switch CR2, directly across the power condensers PC1 and PC2. Thus, the potential difference between the cathodes of valves V1 and V2 and the negative terminal 52 of condenser C2 is proportional to and determined by the charge on the power condensers PC1 and PC2, the proportionality between these potentials being determined by the setting of arm 56 along resistor r10. In turn, except when the hereinafter described biasing potential of resistor r3 is effective, the grid-cathode potentials of valves V1 and V2 are at all times equal to the difference between the last-mentioned potential difference and the potential of condenser C2.

If the power condensers PC1 and PC2 are fully discharged, terminal 52 and the cathodes of valves V1 and V2 have the same potential and, consequently, the grid-cathode potentials of these valves are determined entirely by the charge on condenser C2. In such event, the initial recharging of condenser C2, which takes place at the beginning of each half cycle, is sufficient to bring the grids of valves V1 and V2 either neutral or positive with respect to the cathodes. This action, in turn, renders these valves conductive at or near the beginning of the corresponding half cycles of voltage impressed thereacross by the supply transformer T2, it being assumed that the potentials involved in Fig. 2 are in phase with each other and that the current through valves V1 and V2 is in phase with the voltage of transformer T2. The flow of current through valves V1 and V2 gradually builds up a charge across the power condensers PC1 and PC2, which potential renders the cathodes of valves V1 and V2 progressively more positive with respect to the terminal 52 of condenser C2. Under such conditions, the condenser C2 is unable to render the grids of valves V1 and V2 neutral or positive with respect to their cathodes until such time as the potential of condenser C2 exceeds the potential difference between terminal 52 and the cathodes of these valves. The points in successive half cycles at which valves V1 and V2 are rendered conductive are thus delayed more and more as the charge on the power condensers PC1 and PC2 increases. This relation is indicated in Fig. 2, in which, as aforesaid, the curve E represents the potential impressed across valves V1 and V2 by transformer T2. The curve PC represents the progressively increasing potential across the power condensers PC1 and PC2. At the time $t_o$, the power condensers are in a discharged condition and the curve PC is at a zero value. At the same time, condenser C2 has just been discharged, as described above, and is beginning to recharge. Since the power condensers are at a zero potential, the firing of valves V1 and V2 is determined solely by the charge on condenser C2, which, as aforesaid, fires these valves at substantially the zero point of the curve E. As indicated by the cross-hatching, accordingly, current flows through the valve V1 throughout substantially all of the initial positive half cycle $e1$. At the beginning of the initial negative half cycle $e2$, a charge exists across the power condensers PC1 and PC2, and, consequently, condenser C2 is unable to fire valve V2 until the time $t_1$, at which time the charge on condenser C2 equals the potential difference between terminal 52 and the cathode of valve V2. Current flows through valve V2 during slightly less than the full negative half cycle $e2$, accordingly. Similarly, during the third and fourth half cycles $e3$ and $e4$, the firing points of valves V1 and V2, respectively, are delayed until the times $t_2$ and $t_3$ are reached, which times are progressively later in the corresponding half cycles, by virtue of the progressively increasing charge on the power condensers. Similar comments apply to succeeding half cycles.

As will be appreciated, the gradually increasing potential between terminal 52 and the cathodes of valves V1 and V2 ultimately attains a value which is not matched or overcome by the potential of condenser C2 until a time which is so late in a half cycle that the anode potential applied to the corresponding valve V1 or V2 (depending upon whether the condition in question is attained during a positive or negative half cycle) is too low to cause a break down of such valve. When this condition is attained, valves V1 and V2 cease to pass current to the power condensers and the charging action is complete. This last-mentioned action is illustrated in Fig. 2 by the negative and positive half cycle $ex$ and $ex1$, it being assumed that at the time $t_x$ in negative half cycle $ex$, the anode potential across valve V2 is still high enough to cause a current flow. As a consequence, a slight increment of charge is added to the power condensers during the balance of half cycle $ex$. This final increment of charging current, however, brings curve PC to such a value that at the time $t_{x1}$ in half cycle $ex1$, insufficient potential is applied to valve V1 to cause it to conduct. In such instance, as aforesaid, the charging action ceases at the conclusion of the negative half cycle $ex$.

As will be understood, if a portion of the charge on the power condensers PC1 and PC2 should leak off, this action would again bring the potential between the terminal 52 and the cathodes of valves V1 and V2 to a value low enough to enable condenser C2 to refire these valves and again bring the charge on the power condensers up to the value corresponding to the setting of control arm 56.

When a weld is made, the power condensers are discharged through the welding transformer, as described below, which action, of course, promptly lowers the potentials of the power condensers. A further feature of the present invention resides in an improved arrangement for maintaining the valves V1 and V2 in a blocked condition during such discharge. As illustrated, the hereinafter described firing switch CRF is provided with a normally open contact CRFa. This contact normally isolates the grids of valves V1 and V2 from the negative terminal 60 of resistor r3, the positive terminal 62 whereof is connected to the cathodes of valves V1 and V2. A fixed potential in excess of the maximum potential attained by condenser C2 is maintained across resistor r3 by means of transformer T4 and a usual full wave rectifier V3. At the beginning of a welding operation, the firing switch CRF is energized, which action closes contact CRFa and connects resistor r3 between the grids and cathodes of valves V1 and V2, thereby strongly biasing these grids to a negative potential with respect to these cathodes, and effectively blocking them. Contact CRFa remains closed, as described below, until the welding operation is completed, at which time it reopens and enables the successive firing of valves V1 and V2, as aforesaid, together with the consequent recharging of the power condensers.

In the example given above with respect to the charging of the main condensers, it was assumed that at the beginning of the charging action these condensers were in a fully discharged condition. As described below, each welding operation partially recharges the condensers to a value corresponding, for example, to the value of curve PC at the time $t_y$ in Fig. 2. A recharging action of the power condensers, which immediately follows a welding operation, is begun at an intermediate phase shift point of the valves V1 and V2, instead of at the zero phase shift point corresponding to the time $t_o$ in Fig. 2.

The illustrated system employs a series of five control switches, certain of which are mentioned above. These elements are of a usual electromagnetically operated type, the contacts whereof occupy the positions illustrated in the drawing when the coils are de-energized, but move to and remain in an opposite position when and so long as the coils are energized. The mechanical relation between these coils and contacts is shown in Fig. 3.

It is believed the remaining details of the system may best be understood from a description of the operation thereof, it being understood that so long as the system is out of service, all movable elements occupy the positions shown in Fig. 1. Under such conditions, accordingly, power condenser PC1 is in a fully discharged condition, since it is short circuited through the now closed interlock 70 and through the now closed contact CR4a of control switch CR4. Condenser PC2 is out of service and is directly short circuited through conductors 22 and 24. Interlock 70 may correspond, for example, to a usual interlock associated with the door of the cabinet, in which the mechanism is housed and which prevents a welding operation unless and until the cabinet door is closed. A similar normally open interlock 72 is associated with the circuit of the start and stop buttons 74 and 76, and it will be understood that if the cabinet doors are closed, these interlocks 70 and 72 are respectively opened and closed.

Assuming it is desired to prepare the system to make a welding operation, the usual disconnect switches 80 and 82 may be closed, thereby connecting the line conductors L1 and L2 to a usual alternating current source and completing an obvious energizing circuit for the primary winding of control transformer T1. Upon being energized, transformer T1 completes an obvious energizing circuit for the primary winding of the control transformer CT, the secondary terminals whereof bear the reference character $x$. It will be understood that terminals $x$ of transformer CT are permanently connected to the correspondingly designated primary terminals of transformers T4, T5, T6, T7, T8, T9 and T10 and to the cathode of valve V5. The last-mentioned connection, accordingly, brings the cathode of valve V5 to an emissive temperature, conditioning this valve for action. Energization of transformers T4, T6, T8 and T10, in turn, supply valves V3, V4, V7 and V8 with filament current. In addition, transformer T4 supplies the main charging valves V1 and V2 with filament current. These actions condition the corresponding valves for operation, as will be understood. The energization of transformers T5, T7 and T9 applies anode potential to the corresponding valves V3, V4 and V8. In the case of valve V3, this action results in impressing the indicated biasing potential across resistor r3, which action is otherwise without effect, since contact CRFa is now open. In the case of valve V4, this action results in impressing a potential between terminals 40 and 42, which is sufficient to break down valve V6, it being understood, as aforesaid, that valve V6 functions in usual fashion to maintain a constant potential between the terminals 40 and 42. The fixed potential between the terminals 40 and 42 serves, as aforesaid, to charge condenser C2. As aforesaid, also, valve V5 functions at approximately the zero point between successive half cycles of the voltage impressed across lines L1 and L2, to discharge condenser C2. Condenser C2, during each successive half cycle, brings the grids of valves V1 and V2 to positive values, as indicated in Fig. 2. These actions are without effect under present conditions, however, since the charging transformer T2 is de-energized at contacts CR1a and CR1b of switch CR1.

The above-mentioned application of anode potential to valve V8 enables transformer T9 to apply unidirectional potential to the firing circuits, which are now interrupted at contact CRFc, preparatory to the welding operation.

Assuming it is desired to charge up the power condenser PC1, preparatory to the making of a weld, the start button 74 may be closed, which action, through the now closed interlock 72, completes energizing circuits, in parallel, for transformer T3 and for switches CR1 and CR4. Upon being energized, switch CR4 opens its sole contact CR4a and interrupts the remaining discharge circuit for condenser PC1. Upon being energized, transformer T3 applies anode potential to valve V7. Under the conditions stated, lines 18 and 20 are at the same potential and, consequently, the grid of valve V7 is neutral with respect to the cathode thereof. Accordingly, transformer T3 is enabled to pass current through valve V7 (assuming the anode thereof is now positive) and energize switch CR3. Upon being energized, switch CR3 opens its contact CR3a and closes its contacts CR3b and CR3c. This operation of contacts CR3a and CR3b isolates transformer T11 from the source of firing current and prepares a circuit for connecting transformer T12 to such source. The closure of contact CR3c energizes switch CR2, which thereupon opens its contacts CR2a and CR2d and closes its contacts CR2b and CR2c. These actions, as will be obvious, connect the positive charging line 30 to line 20 and connect the negative charging line 32 to line 18. The resulting charging action of the power condenser PC1, described below, will, consequently, bring this condenser to a polarity such that line 18 is negative and line 20 is positive. It will be noticed that condenser C4 serves to maintain switch CR3 energized during negative half cycles of the source, and that so long as line 18 is either neutral or negative with respect to line 20, the grid of valve V7 is either neutral or positive with respect to the cathode thereof. Throughout the charging action now being initiated, and until such time as the polarities of lines 18 and 20 are reversed, accordingly, switch CR3 will remain in the energized condition.

The energization of switch CR1 causes closure of its contacts CR1a, CR1b and CR1c. The latter contact completes a holding circuit in parallel with the start button 74, which may thereupon be released to the open position without effect. Closure of contacts CR1a and CR1b completes an obvious energizing circuit for the charging transformer T2, which thereupon becomes effective to apply anode potentials to the charging valves V1 and V2. It may be assumed, for example, that the energization of transformer T2 takes place at the beginning of a positive half cycle (which time is represented at $t_0$ in Fig. 2) and that, under such conditions, transformer T2 renders the anode of valve V2 negative, but renders the anode of valve V1 positive. At the same time, there being no charge on the power condenser PC1, condenser C2 is enabled to immediately fire valve V1 and initiate at the time $t_0$ in Fig. 2 a flow of current through valve V1, conductors 30 and 32 and power condenser PC1. It will be understood that if the energization of transformer T2 had taken place instead at the beginning of a negative half cycle, valve V2 would have initiated the charging action. Also, if the energization of transformer T2 had taken place at an intermediate point in a positive or negative half cycle, the initial firing of valve V1 or V2, as the case may be, would have taken place at such intermediate point instead of at the beginning of the corresponding half cycle.

Pursuant to the initial firing of valve V1 or V2, as the case may be, the resultant charging of the power condenser PC1 takes place, as described above in connection with Fig. 2, and ultimately, as also described above, the charge on condenser PC1 attains a value corresponding to the setting of the control arm 56, at which time the charging action ceases. The cessation of the charging action leaves the system in such condition, however, as described above, that if the charge on the power condenser PC1 leaks off or is otherwise prematurely dissipated, valves V1 and V2 are again fired sufficiently long to restore the charge on the power condenser.

As will be appreciated, various different control systems may be utilized to actually initiate the making of the weld and in accordance with the disclosure of the aforesaid copending application, such control systems may be interlocked with the charging apparatus in such a way that the weld cannot be initiated unless and until the power condenser is fully charged. In the present case, the switch 80 is illustrative of a manually or automatically operated element, which may be utilized to initiate the weld, and it will be understood that closure of this contact may be interlocked with other apparatus in such a way as to prevent such closure unless and until the work is properly engaged between the electrodes. The switch 80 may also be maintained closed by automatic means which afford a desired definite timing interval, sufficient to allow for the cycle about to be described.

Closure of switch 80 directly energizes the firing switch CRF, which thereupon closes its contacts CRFa and CRFc and opens its contact CRFb. The closure of contact CRFa, as aforesaid, couples the grids of valves V1 and V2 to the negative terminal of resistor r3, thereby applying a negative bias to valves V1 and V2, which overcomes the effect of condenser C2 and renders these valves non-conductive. The opening of contact CRFb interrupts the discharge circuit for condenser C5. Closure of contact CRFc connects the primary winding of transformer T12 to the source comprising rectifier V8, through the now closed contact CR3b.

The latter action immediately energizes transformer T12 and enables it to apply an igniting potential between the igniter i and the cathode c of the main discharge device MV2. It will be recalled that in the example now being described, line 20 is positive, and in response to the just-mentioned igniting potential thereof, device MV2 becomes conductive and enables the now charged power condenser PC1 to discharge through the welding transformer and supply welding energy to the welding circuit.

The flow of current to transformer T12 also charges condenser C5, which thereupon blocks further such current flow. By virtue of the reactive character of the welding circuit, the flow of current therethrough lags the impressed voltage and after this condenser PC1 has become fully discharged, such reactive energy causes current to continue to flow in the original direction and at least partially recharge condenser PC1 to the opposite polarity. At the conclusion of such current flow, condenser PC1 tends to cause a reverse flow of current through the welding circuit, which reverse current is, however, prevented by rectifier MV2, since it will not pass current in such reverse direction. Such reverse flow is prevented by rectifier MV1 since, although its anode is now positive, no igniting potential exists between its igniter and cathode. The flow of welding current is thus terminated at the conclusion of the just-mentioned single unidirectional surge of current, during which condenser PC1 is initially discharged and is partially recharged to the opposite polarity.

At the beginning of the recharging operation, line 18 is rendered positive relative to line 20. This action, consequently, negatively biases valve V7 and renders this valve nonconductive. As a consequence, switch CR3 resumes the de-energized condition, reopening its contacts CR3b and CR3c and reclosing its contact CR3a. The reopening of contact CR3c de-energizes switch CR2, the four contacts whereof consequently resume the illustrated position, connecting the positive charging line 30 to the now positive line 18 and connecting the negative charging line 32 to the now negative line 20. This action, as will be understood, is preparatory to the reactuation of valves V1 and V2, described below.

The transfer of contacts CR3a and CR3b disconnects transformer T12 from the source of firing current and connects transformer T11 thereto. These actions are, however, without immediate effect, since, as aforesaid, the initial surge of current from the source of firing current and which served to energize transformer T12, also served to charge up condenser C5 and prevent a further flow of current from the source of firing current.

So long as the weld switch 80 is maintained in the closed position, the system remains in the above described partially recharged condition. Usually, as will be obvious, switch 80 is opened shortly after the operations described above have been completed. The opening of switch 80 de-energizes the firing switch CRF, which thereupon reopens its contacts CRFa and CRFc and recloses its contact CRFb. The transfer of contacts CRFb and CRFc, respectively, completes a discharge circuit for condenser C5, and interrupts the circuits for transformers T11 and T12.

The opening of contact CRFa eliminates the blocking bias from the grids of valves V1 and V2, enabling the firing of these valves under the combined influences of the potential of condenser C2 and the potential between the terminal 52 and the cathodes of these valves. In view of the now partially charged condition of the power condenser PC1, it will be appreciated, as aforesaid, that the initial firing of valve V1 or V2 (depending upon the polarity of the source at the time contact CRFa opens) is delayed until an intermediate point in the corresponding half cycle. Such intermediate point is illustrated by the time $t_y$ in Fig. 2.

When the charging action has been completed, as described above, valves V1 and V2 are again blocked off by virtue of the potential between the terminal 52 and the cathodes of these valves. A subsequent welding operation may be initiated and terminated, as before. Such subsequent welding operation proceeds, as before, with the following exceptions. In this case, the energization of the firing switch energizes transformer T11 and fires the main rectifier MV1. This action enables the power condenser PC1 to pass current to the welding circuit in a direction opposite to that initially described and results in partially recharging the power condenser PC1 to a polarity such that line 20 is positive relative to line 18. As soon as, during such recharging, line 20 becomes positive relative to line 18, the grid of valve V7 is rendered positive relative to the cathode thereof. This action enables transformer T3 to re-energize switch CR3, which functions, as initially described, to energize switch CR2, thereby completing the appropriate charging connections between the source and the power condenser, and to prepare the proper firing circuit.

It will be noticed that in the above description of the initial charging operation, following the placing of the system in service, it was assumed that switch CR2 attained its energized position before switch CR1 assumed its energized position. In such case, as aforesaid, the energization of transformer T2 maintained line 20 positive during the initial charging action. The operations which lead to the energization of switches CR2 and CR1 are both initiated at the same time, namely, by the closure of the start button 74 and the above sequence of operation of switches CR2 and CR1 usually obtains. If for any reason the closure of switch CR2 should be delayed until after switch CR1 had closed, (and energized transformer T2) transformer T2 would immediately bring line 18 to a positive value relative to line 20. This action would cause switch CR3, if previously energized, to drop out. In dropping out, however, switch CR3 would condition the firing circuits in the proper manner. It is immaterial, therefore, whether the sequencing of switches CR1 and CR2 initially brings line 20 positive with respect to line 18, or vice versa.

Assuming it is desired to shut down the system, the stop button 76 may be momentarily opened, which action deenergizes switches CR1 and CR4 and also de-energizes transformer T3. The latter action results in de-energizing switch CR2. The de-energization of switch CR1 disconnects the charging transformer from the source, and the de-energization of switch CR4 completes a circuit, through its now closed contact CR4a, through which the power condenser PC1 is gradually but relatively promptly discharged. If the cabinet doors are opened while the power condensers are charged, the interlock 72 opens and interlock 70 closes. The former interlock performs the same function as is accomplished by the opening of the stop button 76 and the latter interlock completes a substantially instantaneous discharge circuit for the power condenser.

Although only a single specific embodiment of the invention has been described, it will be appreciated that various modifications in the form, number and arrangement of the parts may be made without departing from the invention.

What is claimed is:

1. In a system for supplying power to a load circuit, an energy storage device chargeable to either of two opposite polarities, means for coupling the device to the load circuit to enable the device to pass current to the load circuit in either of two directions, additional means for coupling the device to a source of current so as to enable the charging thereof to either of said polarities, and means controlled by and in accordance with the polarity of the device for controlling at least certain of said coupling means.

2. In a system for supplying power to a load circuit, an energy storage device chargeable to either of two opposite polarities, means for coupling the device to the load circuit to enable the device to pass current to the load circuit in either of two directions, additional means for coupling the device to a source of current so as to enable the charging thereof to either of said polarities, and means controlled by and in accordance with the polarity of said device for controlling said first-mentioned coupling means.

3. In a system for supplying power to a load circuit, an energy storage device chargeable to either of two opposite polarities, means for coupling the device to the load circuit to enable the device to pass current to the load circuit in either of two directions, additional means for coupling the device to a source of current so as to enable the charging thereof to either of said polarities, and means controlled by and in accordance with the polarity of said device for controlling said last-mentioned coupling means.

4. In a system for supplying power to a reactive load circuit, the combination of an energy storage device chargeable to either of two opposite polarities, means coupling said device to said circuit so as to enable the device when charged to one polarity to supply energy to the circuit and to enable reactive energy stored in the circuit to be returned and partially recharge the device to the opposite polarity, additional means coupling said device to a source of power so as to complete the recharging thereof to said opposite polarity, and means controlled by and in accordance with the polarity of said device for controlling said last-mentioned means.

5. In a system for supplying power to a reactive load circuit, the combination of an energy storage device chargeable to either of two opposite polarities, means coupling said device to said circuit so as to enable the device when charged to either of said polarities to supply energy to the circuit and to enable reactive energy stored in the circuit to be returned to and recharge the device to the opposite polarity, and means controlled by and in accordance with the polarity of said device for controlling said coupling means.

6. In a system for supplying power to a reactive load circuit, the combination of an energy storage device chargeable to either of two opposite polarities, means including reversely connected asymmetric conducting means coupling said device to said circuit so as to enable the device when charged to either of said polarities to supply energy to the circuit and to enable reactive energy stored in the circuit to be returned to and recharge the device to the opposite polarity, and means responsive to the polarity of said device for controlling said asymmetric conducting means.

7. In a system for supplying power to a load circuit, an energy storage device chargeable to either of two opposite polarities, means coupling said device to the load circuit and including control means for controlling the energization of the load circuit by said device, a polarized energy supplying circuit for charging said device, and means responsive to the polarity of a charge of said device for connecting said energy supplying circuit to said device in correct polar relation whereby the charge of said device may be increased.

8. In an electrical network for controlling stored electrical energy, an electrical energy storage device, a charging circuit for said device adapted to be supplied with energy from a source, an energy receiving circuit adapted to be supplied with energy from said device, said energy receiving circuit including a reactive electrical element whereby the discharge of said device acts to reverse the polarity thereof upon discharge thereof, and means responsive to the polarity of said device for connecting said charging circuit to said device whereby the charge on said device may be increased at said reversed polarity.

9. In a system for supplying power from a source to a load, an electrical energy storage device chargeable to either of two opposite polarities, means for coupling said device to the load for passage of current to the load, additional means for coupling the source with said device in either of said two polarities, and means responsive to the polarity existing on said device for determining the polarity at which said additional means couples said device with the source.

10. In a network for energizing a welding transformer from a source of electrical energy, an electrical energy storage device, circuit means coupling said device across said transformer whereby said transformer is operable to receive the discharge current of said device, said circuit means including means to permit a single unidirectional surge of discharge current from said device to said transformer, circuit means of reversible polarity for connecting said device to said source for charging said device, and means responsive to the polarity of the residual charge on said device subsequent to a said surge for determining the polarity at which said last-named circuit means connects said device with the source.

11. The combination of claim 10 in which means is provided to initiate a said surge and in which said initiating means also renders said source ineffective to charge said device during the period in which said initiating means is effective.

12. The combination of claim 10 in which said unidirectional surge means is operable to permit a said current surge in either direction dependent upon the charged polarity of said device.

13. In a charging circuit for charging an electrical energy storage device from a potential source, means for connecting said source to said device in either of two polarities and means responsive to an existing potential polarity of said device for determining the one of said two polarities at which said means connects said source with said device.

14. The combination of claim 13 in which a network is provided having a pair of terminals the polarity of the potential therebetween being a function of the polarity of the charge on said device, said responsive means including a control valve having a principal electrode and a control electrode, one of said electrodes being electrically connected with one said terminal and the other of said electrodes being electrically connected with a second said terminal whereby the bias potential between said electrodes is a function of the polarity of said device.

15. In a charging network for charging an electrical energy storage device to either of two opposite polarities from a fixed potential source, switch means for coupling said source with said device in either of said polarities, actuating means for said switch means for determining the polarity at which said source is coupled with said device, said actuating means being responsive to the polarity of an initial charge on said device whereby said switch means acts to couple said source with said device to maintain the charge thereon at said initial charge polarity.

16. The combination of claim 15 in which said actuating means includes an electrical conducting device the conduction whereof depends upon the magnitude of and relative polarities of a control potential supplied thereto and further comprising a network responsive to the polarity of said initial charge for supplying said control potential.

GUSTAV E. UNDY.

REFERENCES CITED

The following references are of record in the file of this patent:

UNITED STATES PATENTS

| Number | Name | Date |
| --- | --- | --- |
| 2,179,105 | Sidney | Nov. 7, 1939 |
| 2,250,102 | Klemperer | July 22, 1941 |
| 2,287,540 | Vang | June 23, 1942 |
| 2,295,293 | Rogers | Sept. 8, 1942 |